Nov. 12, 1929.  C. J. HUG  1,735,249
MEASURING DEVICE
Original Filed Jan. 12, 1922
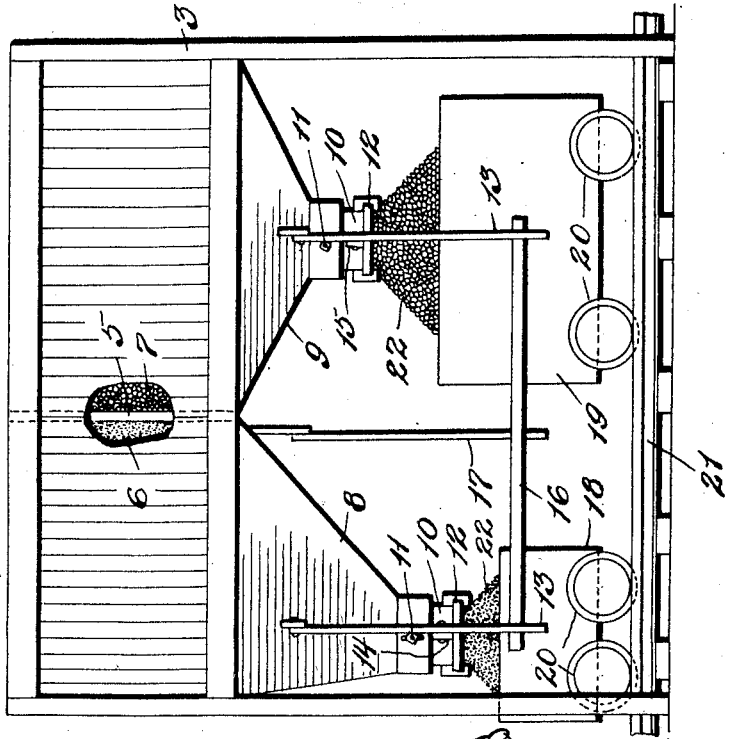
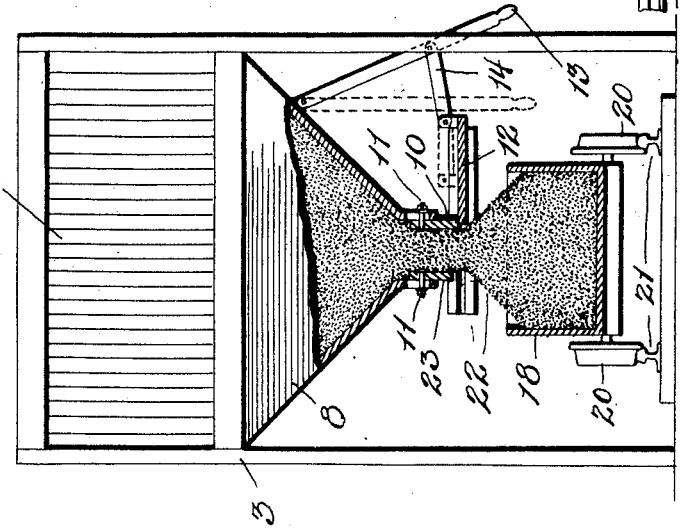
INVENTOR
CHRISTIAN J. HUG,
by James C. Hopkins ATTORNEY.

Patented Nov. 12, 1929

1,735,249

UNITED STATES PATENT OFFICE

CHRISTIAN J. HUG, OF HIGHLAND, ILLINOIS, ASSIGNOR TO THE HUG COMPANY, OF HIGHLAND, ILLINOIS, A CORPORATION OF ILLINOIS

MEASURING DEVICE

Application filed January 12, 1922, Serial No. 528,656. Renewed August 5, 1926.

My invention relates to improvements in measuring devices and has for its object to provide an apparatus whereby masses of crushed, comminuted, or granular material may be measured by the operation of gravity discharged into a suitable receptacle. One of its primary uses is in the measuring of ingredients for concrete construction, such as concrete building construction, road-making and the like, in which it is important to preserve uniformity in the charges of material employed. One object of the invention is to enable charges of two or more ingredients to be discharged and measured simultaneously, and by a single operative means, if desired. Another object is to adjust the measuring of either ingredient without disturbance of the operative means whereby the desired charges or loads of the respective materials are cut off from the source of their supply.

Drawings

Fig. 1 is an end elevation of an apparatus embodying my invention, parts being broken away.

Fig. 2 is a side elevation of said apparatus.

Description

I have selected for the purpose of illustration a proportioning bin arranged for the handling of two ingredients, such as sand and crushed stone. A framework 3 supports the bin 4 which is divided by the partition wall 5 into the sand compartment 6 and crushed stone compartment 7, compartment 6 having the hopper 8 and the compartment 7 having the hopper 9. Each of said hoppers 8 and 9 has a vertically adjustable mouth 10, whose adjustment is effected by means of the bolts 11, or like means. Beneath each of the mouths 10 is a gate-valve 12 operated by the hand-lever 13 and connecting links 14 and 15, the hand-levers 13 being yoked together by the bar 16, when desired, which bar 16 is manipulated by a single hand lever 17 to open and close both of the gate-valves 12 simultaneously.

Beneath the mouths 10 are the sand car 18 and stone car 19 which I have illustrated as being mounted on wheels 20, running on tracks 21, but which receptacles 18 and 19 may be mounted upon a belt, if preferred. The cars, or receptacles, 18 and 19 being positioned as shown in Fig. 2 at a pre-determined distance beneath the hoppers 8 and 9 respectively, the gate-valves 12 are opened and the load is discharged by gravity, forming a mass which is indicated in Fig. 1 by the numeral 22, its base partially filling the receptacle, while the apex of the pile 22 is in the form of a truncated cone which is cut off from the mass of material remaining in the hopper by the action of the gate-valve 12. The apex thus described completes the charge of the desired weight; it is not to be levelled off or struck off within the receptacle, and the purpose of permitting the load or charge to retain its tapering apex is to employ a smaller receptacle and to save the time and the labor otherwise consumed by levelling down the load to the plane of the top of the receptacle, by a strike-off implement. Furthermore, in striking off the contents, and reducing said contents to a level with the top or open mouth of the receptacle, there is inevitably a waste of material, or a slopping over, and out of the receptacle, of such material, which is either wasted or requires time and labor to restore it to the bin. The charge contemplated to be discharged by the operation of my apparatus is the cubic contents of the described mass 22 with its truncated-cone-shaped apex, and the weight of that charge is varied at will by raising or lowering the mouth 10.

In the hopper construction I have found it desirable to cut away the wall 23 above the level of the gate-valve 12 (see Fig. 1) in order to facilitate the closing of said gate-valve 12, which might otherwise be obstructed by lumpy matter in the mass being weighed.

The pair of units thus described may be multiplied indefinitely, according to the number of kinds of substances to be weighed. A third unit, for Portland cement, will be used when desired, but customarily that article is received at the mixing point in small packages of the weight-unit desired. The apparatus as illustrated is adequate to the usual requirements of concrete building-construction or road construction.

In the use of the described apparatus, the load or charge is completed when the material ceases to flow; it is impossible for the material to over-flow the receptacles 18 and 19; and the gate-valve 12 may be closed to cut off the apices of the material at any time after the material has ceased to flow. No damage will result from the failure of the attendant to close the gate-valves 12 immediately after the charge is formed and the flow has ceased.

I am aware that discharging or loading apparatus of various constructions having hoppers provided with valve-controlled discharge openings have been employed in the handling of lump, granular or pulverized materials. My invention relates solely to the measurement of such materials by means of apparatus having a controllable discharge opening at a controllable distance above the discharge-receiving receptacle, thus practically applying the law of the angle of repose, which law is based upon the slope at which the pyramid of deposited material reposes and ceases to slide.

I claim:

In a measuring device having a material bin and a discharge hopper thereon, a walled mouth vertically adjustable on said hopper, guides carried on opposite walls of said mouth, a plate valve slidable in said guides across said mouth, one wall of said mouth terminating above said plate valve to permit free passage of said valve therebeneath.

In testimony whereof I hereunto affix my signature.

CHRISTIAN J. HUG.